March 10, 1942.  F. J. CHANDLER  2,275,612
PERFORATING METHOD AND APPARATUS
Filed Dec. 11, 1940  2 Sheets-Sheet 1
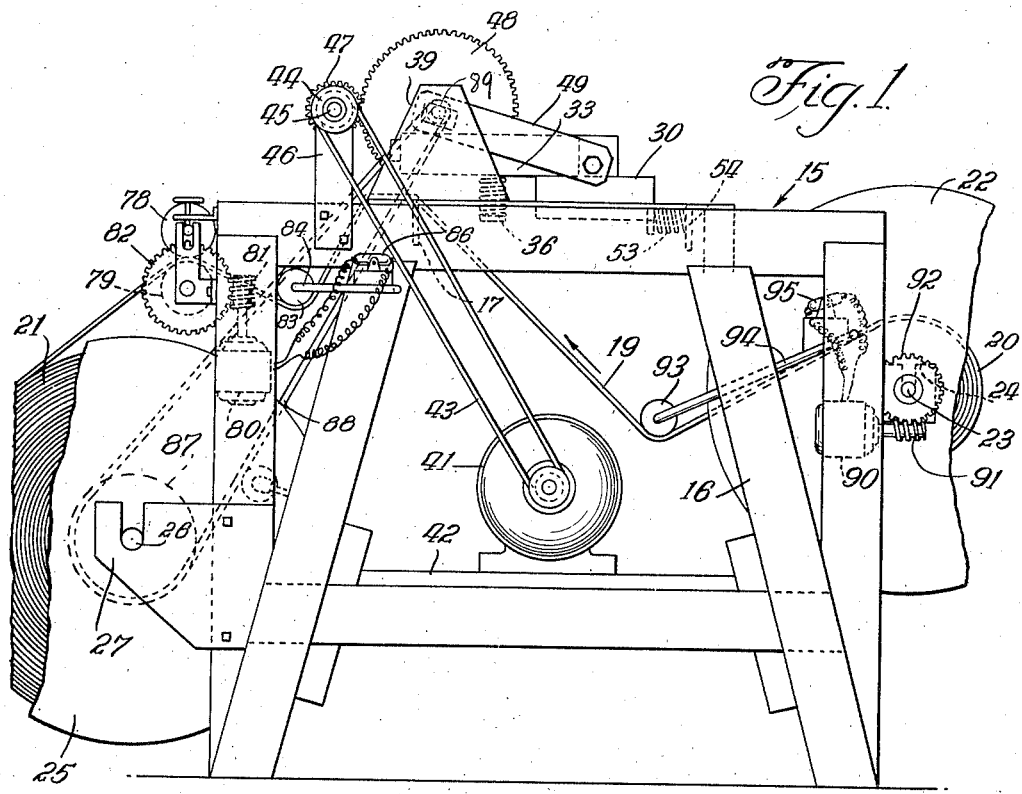
Fig. 1
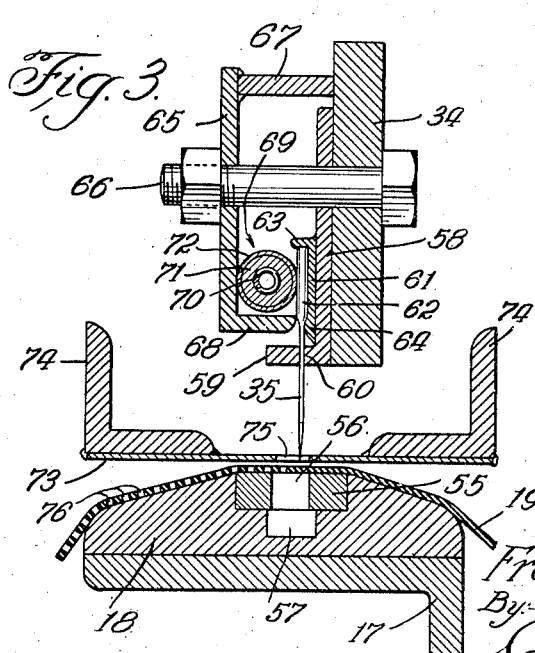
Fig. 3
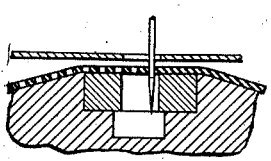
Fig. 4
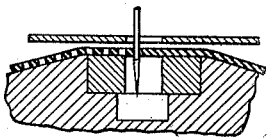
Fig. 5
Fig. 6
Inventor:
Frank Jermain Chandler.
By Eugene M. Giles
Atty.

March 10, 1942.   F. J. CHANDLER   2,275,612
PERFORATING METHOD AND APPARATUS
Filed Dec. 11, 1940   2 Sheets-Sheet 2
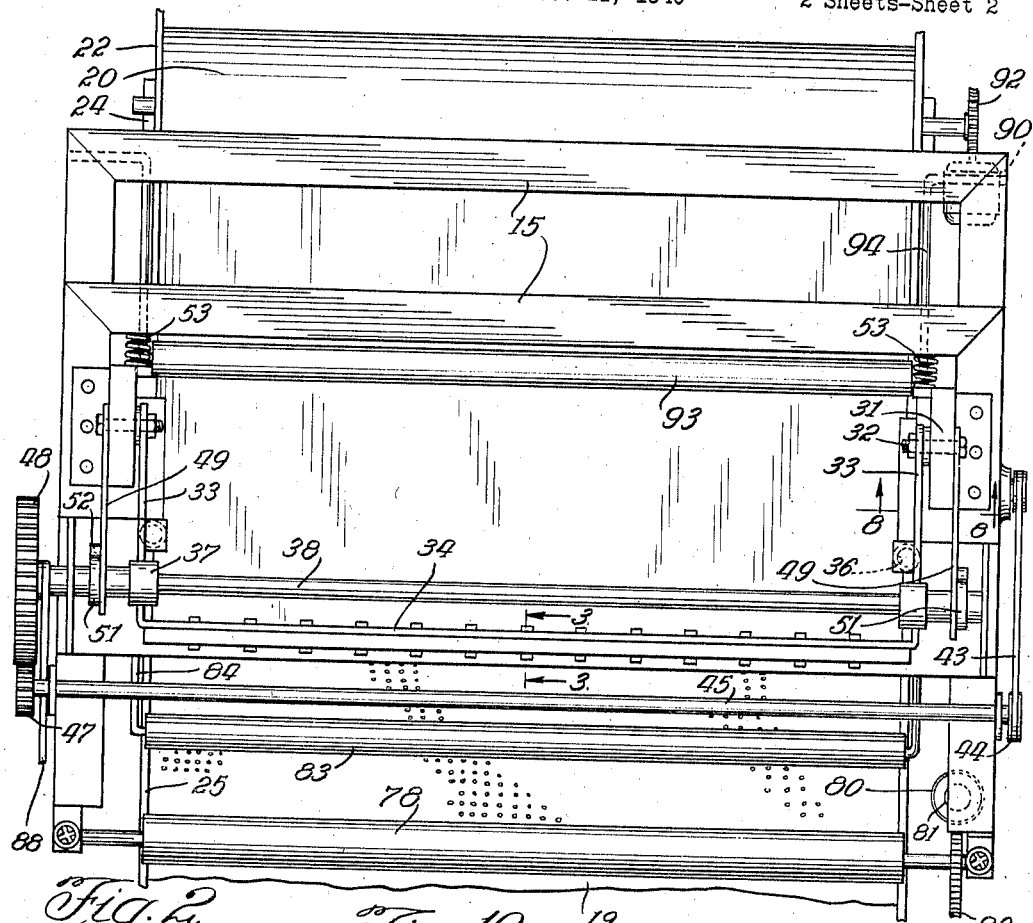
Fig. 2.
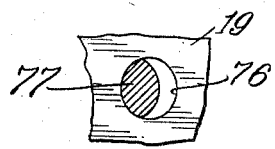
Fig. 10.
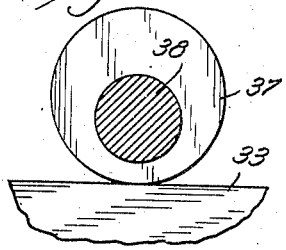
Fig. 8.
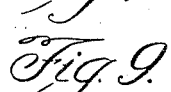
Fig. 7.
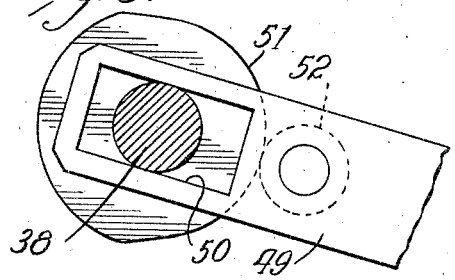
Fig. 9.
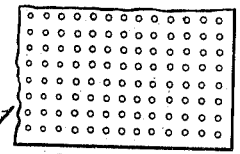
Fig. 11.
Inventor:
Frank Jermain Chandler
By Eugene M. Giles
Att'y.

Patented Mar. 10, 1942

2,275,612

UNITED STATES PATENT OFFICE 2,275,612

PERFORATING METHOD AND APPARATUS

Frank Jermain Chandler, Toledo, Ohio

Application December 11, 1940, Serial No. 369,586

10 Claims. (Cl. 164—90)

This invention relates to the perforating of sheet materials composed partly or wholly of rubber or the like, and has reference more particularly to a method of and machine for puncturing with localized heat at each point of puncture and advancing the material by means of the puncturing members. In general, my present invention is similar to that disclosed in my pending application Serial No. 323,313, filed March 11, 1940.

When preparing sheet rubber, rubber coated fabrics, laminated rubber and fabric sheets and other similar materials for certain uses, such as the manufacture of shoes, clothing and upholstery, it is oftentimes desirable to perforate the sheets or fabrics to permit ventilation or "breathing," as it is commonly called, but because of the elasticity and subsequent processing of the rubber it is difficult to provide satisfactory perforations which are inconspicuous and at the same time sufficiently permanent to be preserved in the final product. Such sheets are perforated preferably before the rubber is cured or vulcanized, and the heating and softening of the rubber which occurs in the curing or vulcanization tends to deform and partly close the perforations thus impairing the breathing qualities of the material.

The principal objects of my invention are to provide an improved method and apparatus whereby sheets of the above mentioned character are provided with a multiplicity of properly spaced, uniform openings suitable for ventilation or breathing; to form the openings in a manner to impart permanence thereto and avoid closing thereof or impairment of their breathability in subsequent processing of the material; to obviate mutilation or injury to the material or marring or defacing of any surface pattern thereon; and to impart a rounded shape to the openings or perforations through the pull exerted by the needles in advancing the material, these and other objects being accomplished as pointed out hereinafter and as shown in the accompanying drawings in which:

Fig. 1 is a side elevation of a machine embodying my present improvements;

Fig. 2 is a top view of the machine;

Fig. 3 is an enlarged detail sectional view of the material support and needle assembly taken substantially on the line 3—3 of Fig. 2;

Figs. 4, 5 and 6 are partial views of the structure of Fig. 3 showing three successive positions of the needles in perforating and advancing the work;

Fig. 7 is a plan view of a section of the material with the inserted perforating needle in section and showing the enlargement and rounding of the perforation in advancing the work;

Fig. 8 is an enlarged detail sectional view on the line 8—8 of Fig. 2 showing the slide structure through which the pins are operated to advance the work;

Fig. 9 is a fragmentary side elevation of the cam mechanism which imparts reciprocation to the slide structure of Fig. 8;

Fig. 10 is a side elevation of the cam mechanism which causes the perforating operation; and Fig. 11 is a fragmentary plan view of the perforated work.

Referring to the drawings, the reference numeral 15 indicates the machine frame which comprises side standards 16 rigidly connected together in suitable spaced relation to accommodate therebetween the sheet material to be perforated. A brace member 17 extends between these standards 16 at the top and has secured thereon a work support 18 over which the sheet material 19 is fed from a supply roll 20 to a receiving roll 21, it being understood that this work support extends between the side standards 16 to afford a continuous support across the top of the machine for the sheet material 19.

The roll 20 is carried on a reel 22 the shaft 23 of which is removably mounted in open top bearings 24 on the opposite side frames 16 respectively and the roll 21 is carried on a reel 25 the shaft 26 of which is likewise removably mounted in open top bearings 27 on the respective opposite side frames 16. Facilities, hereinafter described are provided to maintain sufficient slack in the web of material 19 between each roll 20 and 21 and the material support 18 to permit advancing movement of the web across the support 18 by the perforating needles as hereinafter explained, and there are also facilities likewise described hereinafter by which the perforated web is automatically wound on the reel 25 as excess slack occurs at that side of the work support 18.

Mounted on the top of each side standard 16 is a bracket member 28 (see Fig. 8) formed along the inner edge with an upraised T-shaped slideway 29 of suitable length to accommodate a slide member 30, and each slide member 30 has an upwardly projecting lug 35 to which is pivoted at 32 the respective arm 33 of a wide yoke which is formed with a cross bar 34 which extends across the machine over the work support 18 and carries a series of needles 35 for perforating the work on the support 18.

This cross bar 34 of the yoke is normally held in upraised position by springs 36 interposed between the yoke arms 33 and the side frames 16 and is depressed periodically by cams 37 on a shaft 38 which extends across the machine above the yoke and is journaled in side brackets 39 on the side frames 16, the cams 37 being located directly above the arms 33 to bear thereagainst. A motor 41 mounted on a platform 42 between the standards 16 is connected by a belt 43 with a pulley 44 on a shaft 45 journaled in brackets 46 which extend upwardly from the side frames 16, and this shaft has a pinion 47 thereon meshing with a spur gear 48 on the shaft 38 to rotate the latter for depressing the needle carrying yoke 33—34.

A pair of links 49 are also provided, one at each side of the machine, pivoted to the outer side of the respective slide member 30 on the pivot 32 thereof and these links extend forwardly and upwardly from the pivots 32 and at their forward ends each is provided with an elongated slot 50 through which the shaft 38 extends. On the shaft 38 adjacent each link 49 is a cam 51 which engages a roller 52 on the respective link 49 for reciprocating the slide members 30 along the slideways 29, each slide member 30 having a spring 53 interposed beteween the rear end thereof and the frame member 54 to exert a forward sliding tension on the slide member 30.

Thus in each revolution of the shaft 38 the yoke member 33—34 is depressed by the cams 37 and the slides 30 are also reciprocated carrying the yoke 33—34 therewith, the cams 37 and 51 being so arranged and the cam 51 formed as shown in Fig. 9 so that the slides 30 and yoke 33—34 are retracted rearwardly while the yoke is upraised and moved forwardly while the yoke is depressed.

The needles 35 which are arranged in a row across the front of the yoke crossbar 34 in suitable spaced relation to provide perforations at desired intervals are projected downwardly through the sheet 19 on the support 18 when the yoke is depressed by cams 37 and while the yoke is moved forwardly by the springs 53 as permitted by the cams 51, and in this operation the needles 35 not only perforate the sheet material 19, but also while engaged therewith advance the sheet material over the support 18 for the next row of perforations which occur during the next revolution of the shaft 38.

The top face of the work support 18 is preferably recessed to accommodate the die block 55 at the place where the perforating operation occurs and this die block is provided with slots 56 at intervals corresponding to the spacing of the needles 35 to accommodate the ends of the needles which are inserted through the material 19, said slots being of sufficient length to permit free forward movement of the needles 35 as the latter are moved forwardly to advance the work. Preferably also the work support 18 is recessed at 57 under the slots 56 to afford ample depth for insertion of the needles 35 through the material 19.

For mounting the needles 35 on the yoke crossbar 34 the latter is provided on its front face with an angle iron 58 having a narrow flange 59 at the bottom with apertures 60 at suitably spaced intervals to receive the needle stems and on the front face of this angle iron 58 above the flange 59 is a seating plate 61 for the needle shanks 62 formed with a shoulder 63 at the top and a bead 64 along the bottom by which the needles are locatable at the proper uniform elevation. A clamp plate 65 is secured by bolts 66 to the front of the yoke crossbar 34 and has along its upper edge a flange 67 which bears against the front face of the yoke crossbar 34 and at its lower edge a flange 68 with beveled edge, as shown in Fig. 3, which bears against the shanks 62 of the needles 35 and holds same securely in position against the seating plate 61.

For perforating sheet rubber, rubber coated fabrics, laminated rubber and fabric sheets and other similar materials, it is desirable to heat the needles not only to facilitate penetration of the needles through the rubber material, but also to cause an incipient vulcanization of the rubber around the perforation to give permanence to the opening and prevent mutilation or closing of the opening which otherwise is likely to occur in the subsequent processing of the material as explained in my aforesaid application Serial No. 323,313. For heating the needles for this purpose an electrical heating element 69, preferably of a well known type comprising a resistance 70 embedded in insulation 71 and enclosed in a metal sheath 72 is clamped by the plate 65 against the needle shanks 62 and connected with a suitable source of electric energy controlled by a thermostat in a well known manner to maintain the needles 35 at the required temperature for easy penetration and incipient vulcanization of the rubber immediately around each opening formed in the material 19 by the needles.

To facilitate withdrawal of the needles 35 from the material 19 after each perforating operation a stripper plate 73 is provided which extends across the machine above the work support 18. This stripper plate which is spaced above the work support 18 a sufficient distance to provide clearance for free advancing movement of the sheet material 19 between the stripper plate and work support may be mounted on angle irons 74 secured at their opposite ends to the side frames 16, and this stripper plate has slots 75 therethrough corresponding to the slots 56 of the die block 55 to receive the needles 35 therethrough in the perforating operation and permit the forward movement of the needles for advancing the work.

By reason of the advancement of the work by forward movement of the needles 35 the latter necessarily exert a pull on the work which tends to elongate the perforations 76. Preferably the openings 76 are round or substantially round, and in order to compensate for the stretching or elongation of the openings 76 occasioned by the pull of the needles in advancing the work and insure round or substantially round openings 76 in the finished material 19, the needles 35 are preferably formed oval in cross section as indicated at 77 in Fig. 7 with the minor axis of the oval extending in the direction of the pull exerted on the material 19 in advancing same across the work support 18 so that an oval opening is formed in the sheet material by each needle 35 as the latter penetrates the material 19 and as the needles are projected forwardly to advance the work of elongation of the openings re-forms the oval opening into an opening of substantially circular form as indicated in Fig. 7, thereby insuring substantially round openings in the finished material.

In order to permit advance movement of the material 19 by the needles 35 across the work support 18 and hold the material in proper position on the work support while the needles are withdrawn, facilities are provided to maintain sufficient slack in the material 19 at each side of the work support 18 to allow freedom for advancing movement while at the same time sufficient tension is imposed thereon to prevent displacement of the material on the support 18 while the needles are withdrawn. To this end a pair of rolls 78 and 79 are provided at the front of the machine between which the perforated material 19 passes to the roll 21, one of which rolls, for example the roll 79 is operated by a motor 80 through the worm 81 and worm wheel 82 to advance the perforated sheet to the roll 21 under control of a roller 83 resting on the perforated sheet 19 between the work support 18 and the rolls 78—79. This roll 83 is carried by a frame 84 pivoted on the frame standards 16—16 and this frame 84 is provided with a mercury switch 86 through which current is supplied to the motor 80, the arrangement being such that when the slack in the sheet 19 between the work support 18 and the rolls 78—79 exceeds a certain amount, the roll 83 on the material 19 will depress sufficiently to close the mercury switch 86 and cause operation of the motor to advance the perforated sheet 19 between the rolls 78 and 79 and when these rolls 78 and 79 have operated sufficiently to diminish to a predetermined extent the slack in the sheet 19 between the work support 18 and the rolls 78—79, the roll 83 will be raised sufficiently to open the mercury switch 86 whereupon the motor 80 ceases operation. Thus a predetermined slack is automatically maintained in the perforated sheet material between the work support 18 and the rolls 78—79.

It is preferred to wind the perforated sheet on the reel 25 as it is fed between the rolls 78 and 79 and for this purpose the shaft 26 of said reel is provided with a pulley 87 engaged by the belt 88 trained about a small pulley 89 on the shaft 38 to exert a constant winding tension on the drum 25, it being understood of course, that the belt 88 engages the pulley 89 sufficiently loosely to permit slippage when the reel 25 is not free to turn.

Similar facilities are provided to feed the unperforated material 19 from the reel 22 which is operated by a motor 90 through the worm 91 and worm wheel 92 on the shaft 23. A roller 93 which rests on the sheet material 19 between the work support 18 and reel 22 is carried on a swinging frame 94 which is provided with a mercury switch 95 which controls the operation of the motor 90 in a manner similar to the switch 86 of the motor 80 so that as the amount of slack in the material 19 between the reel 22 and work support 18 is reduced to a predetermined extent, the roll 93 is lifted and the mercury switch 95 closed to operate the motor 90 which then unwinds the material 19 from the reel 22 until the roll 93 drops down to a position to open the mercury switch 95 and discontinue the operation of the motor 90. Thus the material is automatically supplied from the reel 22 to maintain a predetermined amount of slack between the reel 22 and the work support 18 and the perforated material is automatically advanced between the rolls 78 and 79 to maintain a certain amount of slack in the perforated material between the work support 18 and the rolls 78 and 79 and the perforated material is automatically wound on the reel 25 as it is fed between the rolls 78 and 79.

While I have shown and described my invention in a preferred form, I am aware that various changes and modifications may be made therein without departing from the spirit of my invention, the scope of which is to be determined by the appended claims.

I claim as my invention:

1. A method of making perforated sheet material which comprises providing sheet material composed at least partly of rubber or the like, then forming perforations through the sheet material and stretching the perforations to a larger size and locally setting the rubber or like material around each perforation to impart permanence thereto.

2. A method of making perforated sheet material which comprises providing sheet material composed at least partly of rubber or the like, then forming perforations entirely through the sheet material and simultaneously subjecting the walls of the perforations to localized heat sufficient to locally soften and partially cure the rubber of said walls, and while subjecting to the localized heat, subjecting the material to such tension as will enlarge the perforations.

3. A method of making perforated sheet material which comprises providing sheet material composed at least partly of rubber or the like, thrusting needles through the sheet material to perforate the same, and while the needles engage the sheet material, imparting relative movement thereto whereby the perforations are enlarged and the material relocated for the next succeeding thrust of the needles.

4. The invention according to claim 3 wherein the needles are heated to locally vulcanize the perforation walls, and the material is under sufficient tension when relatively moved to enlarge the perforations so the needles fit loosely therein.

5. A method of forming perforations of a permanent character in sheet material composed at least partly of rubber or the like, which comprises thrusting heated needles through said material, enlarging the perforations with the needles therein and simultaneously imparting advancing movement to the material through the needles, then withdrawing the needles and positioning them opposite an unperforated area of the material.

6. The invention of claim 5 wherein the needles when engaged with the material are moved in a direction transverse to their length.

7. A method according to claim 5 wherein needles of oval cross section are moved in the direction of the minor axis of the oval to advance the material.

8. In apparatus of the character described, the combination of a work support, a plurality of needles, means to reciprocate the needles to and from the work support to perforate work thereon, means to move the needles laterally in the work penetrating position and thereby advance the work, and tension equalizers at opposite sides of the work penetrating position independently operable respectively to allow work to be supplied to and to withdraw work from the work puncturing position.

9. In apparatus of the character described, the combination of a work support, work tensioning means, work feeding means, a plurality of needles of oval cross section, means to move said needles to puncture the work and advance the material, said work tensioning means being constructed and arranged to stretch the oval punctures made by the needles into substantially round openings as the material is advanced.

10. In apparatus of the character described, the combination with a work support, a supply roll, and a receiving roll, of a plurality of needles of oval cross section, means to move said needles to puncture the work and to advance the same, and means to cause stretching of the oval punctures made by the needles into substantially round openings.

FRANK JERMAIN CHANDLER.